United States Patent [19]

Utsumi

[11] Patent Number: 4,644,536
[45] Date of Patent: Feb. 17, 1987

[54] METHOD AND APPARATUS FOR MULTIPLEXING DIGITAL SIGNALS

[75] Inventor: Kuniaki Utsumi, Osaka, Japan

[73] Assignee: Matsushita Electric Industrial Co., Ltd., Osaka, Japan

[21] Appl. No.: 630,015

[22] Filed: Jul. 12, 1984

[30] Foreign Application Priority Data

Jul. 13, 1983 [JP] Japan ............................ 58-128338

[51] Int. Cl.⁴ .............................................. H04J 3/06
[52] U.S. Cl. .................................................. 370/100
[58] Field of Search .......................... 370/84, 100, 112

[56] References Cited

U.S. PATENT DOCUMENTS

| | | | |
|---|---|---|---|
| 3,781,818 | 12/1973 | Pardoe et al. | 370/111 |
| 3,995,120 | 11/1976 | Pachynski, Jr. | 370/111 |
| 4,340,962 | 7/1982 | Wintzer et al. | 370/100 |
| 4,359,770 | 11/1982 | Suzuka | 370/100 |
| 4,437,183 | 3/1984 | Profet | 370/111 |
| 4,445,215 | 4/1984 | Svendsen | 370/111 |
| 4,519,073 | 5/1985 | Bertocci et al. | 370/111 |
| 4,520,480 | 5/1985 | Kawai | 370/111 |

Primary Examiner—Robert L. Griffin
Assistant Examiner—Kenneth I. Rokoff
Attorney, Agent, or Firm—Burgess, Ryan & Wayne

[57] ABSTRACT

There is provided a method of multiplexing digital signals which includes multiplexing serial digital signals of a plurality of channels having a given transmission rate and each of which has frame synchronizing signals to a single serial signal, converting signals excluding the frame synchronizing signals of one selected channel to a format which allows inverse-conversion and which does not allow detection of the frame synchronizing signals and using the frame synchronizing signals of the one selected channel as frame synchronizing signals of the single serial signal. There is also provided apparatus for performing the method which includes circuitry for the steps referred to above.

3 Claims, 6 Drawing Figures

METHOD AND APPARATUS FOR MULTIPLEXING DIGITAL SIGNALS

BACKGROUND OF THE INVENTION

The present invention relates to a method and apparatus for multiplexing digital signals by using a frame synchronizing signal of one channel as a frame synchronizing signal of a multiplexed digital signal when a plurality of digital signals having the same bit rate are multiplexed in digital signal processing.

In conventional digital multiplexing, a plurality of low-speed signals having a given bit rate are multiplexed to give a high-speed signal. In this case, since multiplex data is added to the transmission data, the bit rate of the multiplexed transmission data does not become an integer multiple of the bit rate of the low-speed signal. This will be described with reference to FIG. 1. FIG. 1 shows an example wherein two digital signals are multiplexed. Reference symbols A and B denote two digital signals of a given bit rate. Reference symbols $a_{0-7}$, $a_{0-8}$, ..., $a_{2-5}$, $a_{2-6}$, $b_{0-5}$, $b_{0-6}$, ..., $b_{2-3}$ and $b_{2-4}$ denote data bits, respectively; and F, a frame synchronizing signal. The frame synchronizing signals F are set in an alternating pattern of logic "0" and logic "1". The signals A and B have an identical frame format. Reference symbol C denotes a multiplexed signal. Reference symbols a and b of the multiplexed signal format denote data bits of the signals A and B, respectively. A frame synchronizing signal Fa of the multiplexed signal corresponds to the frame synchronizing signal F of the signal A or B and indicates the multiplexed relationship between the signals A and B. The frame synchronizing signal Fa of the multiplexed signal is required at the time of demultiplexing. When the bit rate of the signals A and B is given to be f bits/sec (b/s), two frame synchronizing signals are included for every 20 bits of the multiplexed signal C. Therefore, the bit rate of the multiplexed signal is calculated to be (f × 20/9) b/s.

FIG. 2 is a block diagram of a multiplex circuit which realizes the function described above. A clock generator 1 comprises a quartz crystal oscillator for oscillating clocks or a circuit for generating clocks in response to externally supplied clocks. Reference numeral 2 denotes a 1/20 frequency divider for frequency-dividing the clock with a frequency division ratio of 1/20; 3, a VCO (voltage-controlled oscillator) for oscillating at a frequency about f Hz; 4, a 1/9 frequency divider; and 5, a phase comparator. The VCO 3, the 1/9 frequency divider 4 and the phase comparator 5 constitute a PLL (phase-locked loop). A 1/9 frequency-divided clock from the VCO 3 is phase-locked with a 1/20 frequency-divided clock from the clock generator 1. Therefore, if the frequency of the clock generator 1 is given to be fa Hz, a relation f × 1/9 = fa × 1/20 is satisfied. Serial-parallel converters 6 and 7 convert serial inputs 10 and 9 to 9-bit parallel data by using the frequencies f Hz and (f × 1/9) Hz, respectively. A multiplexer 8 receives 9-bit outputs (i.e., 18-bit parallel signals) from the serial-parallel converters 6 and 7 and a frame synchronizing signal input 11 and converts the input signals to a serial multiplexed signal 12. When the alternating pattern of logic "1" and logic "0" is used for frame synchronization, every other signal Fa is used as a frame synchronizing signal, the remaining signals Fa can be used for another purpose. In this case, two frame synchronizing bits can be used as the frame synchronizing signal input 11 for every 20 bits of the multiplexed signal. However, according to the multiplexing described above, 9/20 frequency division must be performed, and so the multiplex circuit becomes complicated, and the control of phases between the signals is difficult. Since a complex demultiplex circuit is also required, the overall circuit arrangement becomes complicated, resulting in inconvenience.

SUMMARY OF THE INVENTION

It is an object of the present invention to provide a method and apparatus for multiplexing digital signals, wherein data is converted except for a frame synchronizing signal of one channel signal among a plurality of channel signals to be multiplexed, the frame synchronizing signal of the one channel is used as a frame synchronizing signal of a multiplexed signal, and a new frame synchronizing signal is not added to the multiplexed signal, so that a bit rate of the multiplexed signal becomes an integer multiple of that of the plurality of channel signals in a simple circuit arrangement.

In order to achieve the above object of the present invention, there is provided a method and apparatus for multiplexing digital signals, wherein the frame synchronizing signal of one channel signal among a plurality of channel signals having a given bit rate is used as the frame synchronizing signal of the multiplexed signal, and the new frame synchronizing signal is not added at the time of multiplexing, thereby setting the bit rate of the multiplexed signal to be an integer multiple of the plurality of channel signals. As a result, frequency conversion can be easily performed, the relationship between the phases of the signals is given as constant, and the circuit arrangement is simplified. However, there is a possibility of generating the same signal as the desired frame synchronizing signal in the multiplexed signal. In order to prevent this, signal components of digital signals to be multiplexed and corresponding to steady pseudo frame synchronizing signals, except for signal components corresponding to the desired frame synchronizing signal of the multiplexed signal, are data-converted. By this data conversion, the same signal as the frame synchronizing signals of the multiplexed signal is never generated. The data conversion has a format allowing reconversion to the original data pattern.

BRIEF DESCRIPTION OF THE DRAWINGS

FIG. 1 shows formats of signals A to C for explaining a conventional multiplex scheme;

FIG. 3 shows formats of signals A to D for explaining multiplexing according to an embodiment of the present invention;

DESCRIPTION OF THE PREFERRED EMBODIMENTS

Preferred embodiments of the present invention will be described with reference to the accompanying drawings.

Figure 1:
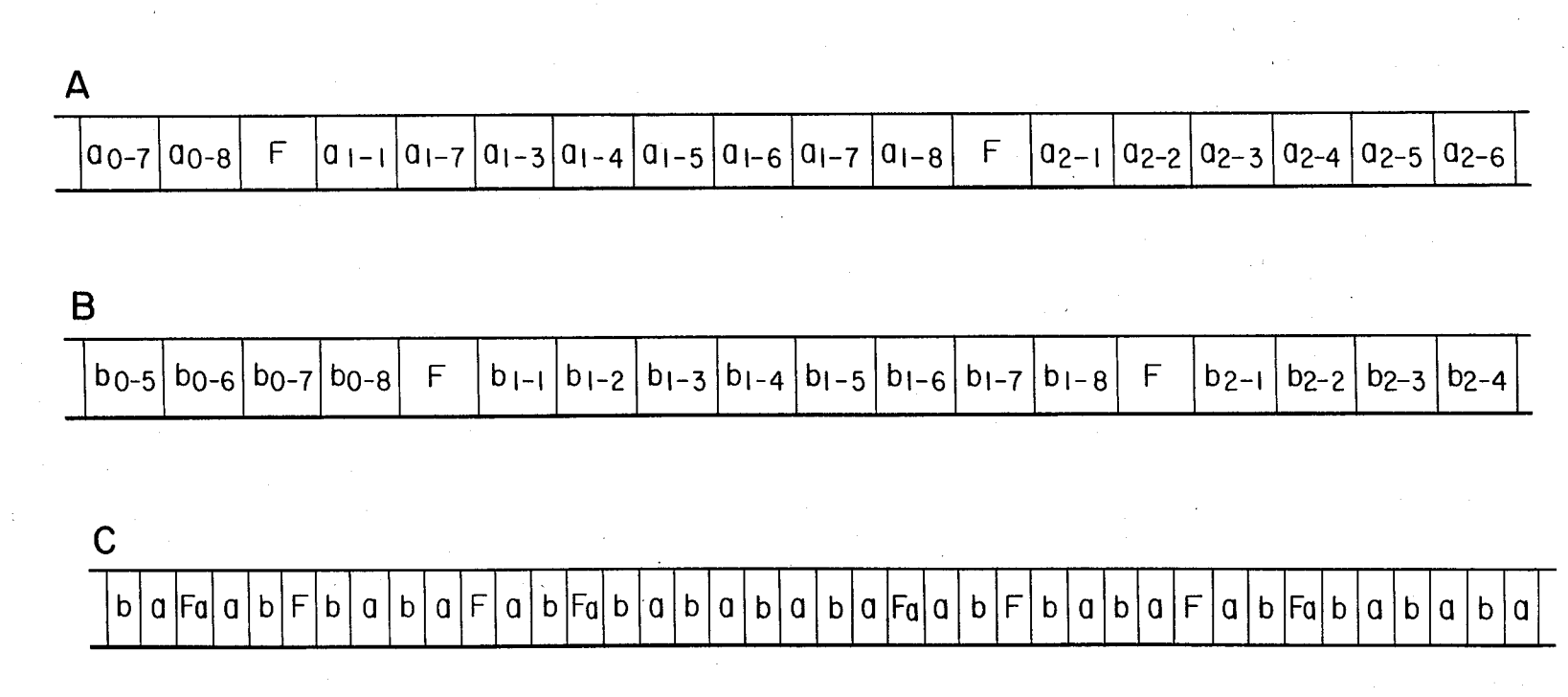

FIG. 3 shows formats of digital signals according to an embodiment of the present invention. The same reference symbols and numerals used in FIG. 3 denote the same parts in FIG. 1. Signals A and B are the same as those in FIG. 1 and have a given bit rate. A signal C is a bit-multiplexed signal of the signals A and B. When the frame synchronizing signal of the signal A has the same format (i.e., an alternating pattern of logic "1" and logic "0") as that of the signal B, two types of frame synchronizing signals are present for every 18 bits. These frame synchronizing signals cannot be discriminated by a demultiplex circuit. A signal D is a converted multiplexed signal obtained such that all data a and b except for the frame synchronizing signals of the signal A of the multiplexed signal C are converted. The converted bits are designated by c. Therefore, the signal D will not have frame synchronizing bits except for signals F. Therefore, the two types of frame synchronizing signals can be discriminated by the demultiplex circuit.

Figure 2:
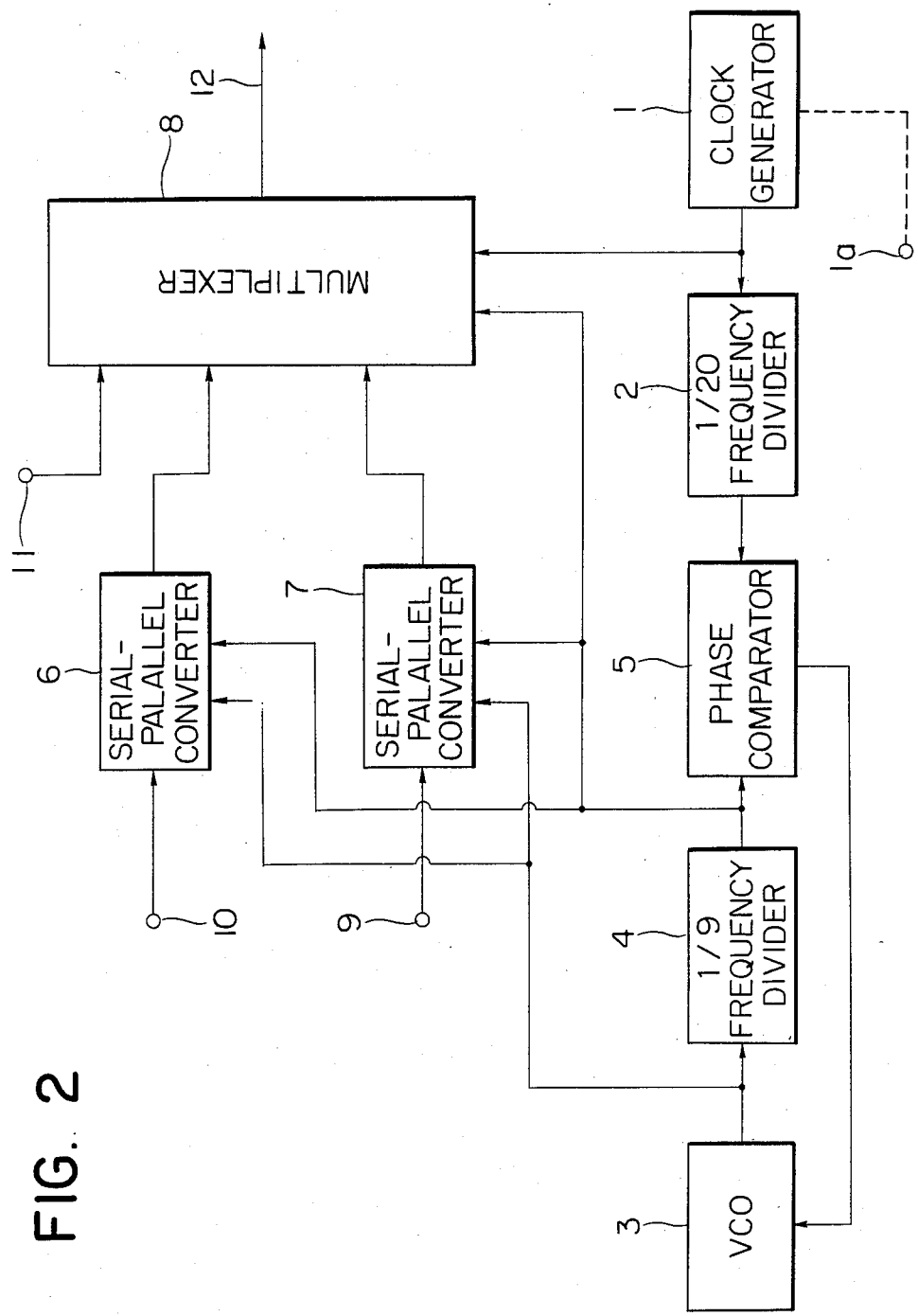
FIG. 2 is a block diagram of a multiplex circuit for explaining the conventional multiplex scheme of FIG. 1.
Figure 4:
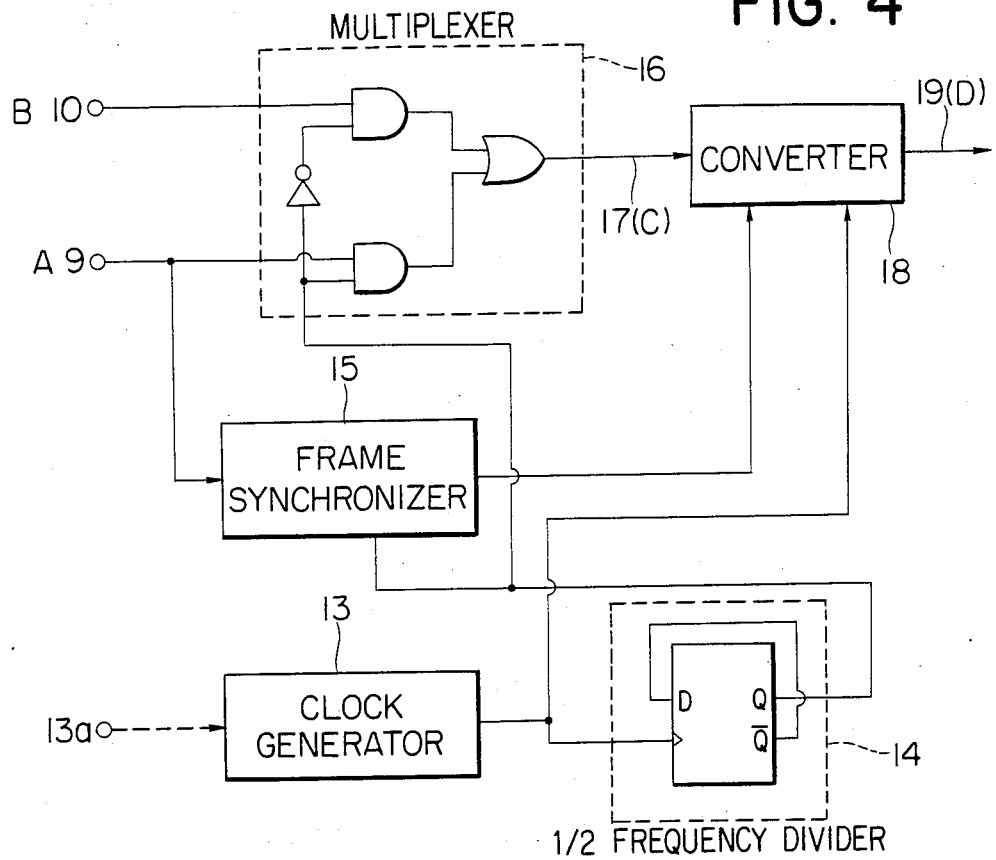
FIG. 4 is a block diagram of a multiplex circuit for explaining the multiplexing of FIG. 3.

FIG. 4 is a block diagram of a multiplex circuit for implementing the function described above. Reference numeral 13 denotes a clock generator which comprises a quartz crystal oscillator or a circuit for generating clocks in response to externally supplied clocks 13a. When the bit rate of the signals A and B is given to be f b/s, the oscillation frequency of the clock generator 13 is 2f Hz. Reference numeral 14 denotes a frequency divider which frequency-divides the clock of 2f Hz and generates a clock of f Hz. In this embodiment, the ½ frequency divider 14 comprises a D flip-flop. Reference numeral 15 denotes a frame synchronizer which detects a frame of an input signal 9 (signal A in FIG. 3) and supplies a detection signal which represents a bit position of the frame synchronizing pulse so as to cause a data converter (to be described later) to not convert the frame synchronizing pulse. A multiplexer 16 performs bit multiplexing of two input signals 9 and 10. An output 17 from the multiplexer 16 corresponds to the signal C in FIG. 3. Reference numeral 18 denotes a data converter for converting the signal C to the signal D shown in FIG. 3. The bit positions of the frame synchronizing signals are acknowledged in response to the detection signal from the frame synchronizer 15. An output 19 from the data converter 18 corresponds to the signal D in FIG. 3. Since the multiplexer 16 performs bit multiplexing, a simple circuit arrangement can be employed. In addition, the clock frequency ratio is given to be 1 : 2, thereby obtaining a stable phase relationship and hence performing simple phase control.

Figure 5:
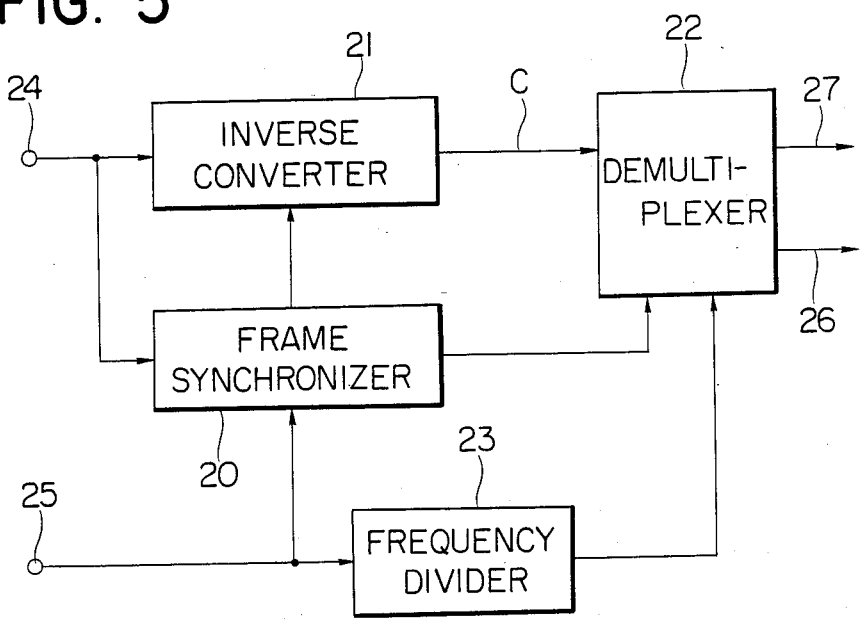
FIG. 5 is a block diagram of a demultiplex circuit for demultiplexing the signal multiplexed by the multiplex circuit of FIG. 4.

FIG. 5 is a block diagram of a demultiplex circuit. Reference numeral 20 denotes a frame synchronizer for synchronzing the frame of an input signal 24 (corresponding to the output signal 19 in FIG. 4). The frame synchronizer 20 detects an alternating pattern of logic "1" and "0" for every 18 bits and performs frame synchronization. Reference numeral 21 denotes a data inverse converter for inverse-converting the bits c to the original bits when frame synchronization is established. An output from the inverse converter 21 corresponds to the signal C in FIG. 3. A clock 25 of 2f Hz is frequency-divided by a frequency divider 23 which generates a clock of f Hz. Reference numeral 22 denotes a demultiplexer for demultiplexing the signal from the data inverse converter 21 and generating signals 26 and 27. The signals 26 and 27 correspond to the input signals 9 and 10, respectively.

Figure 6:
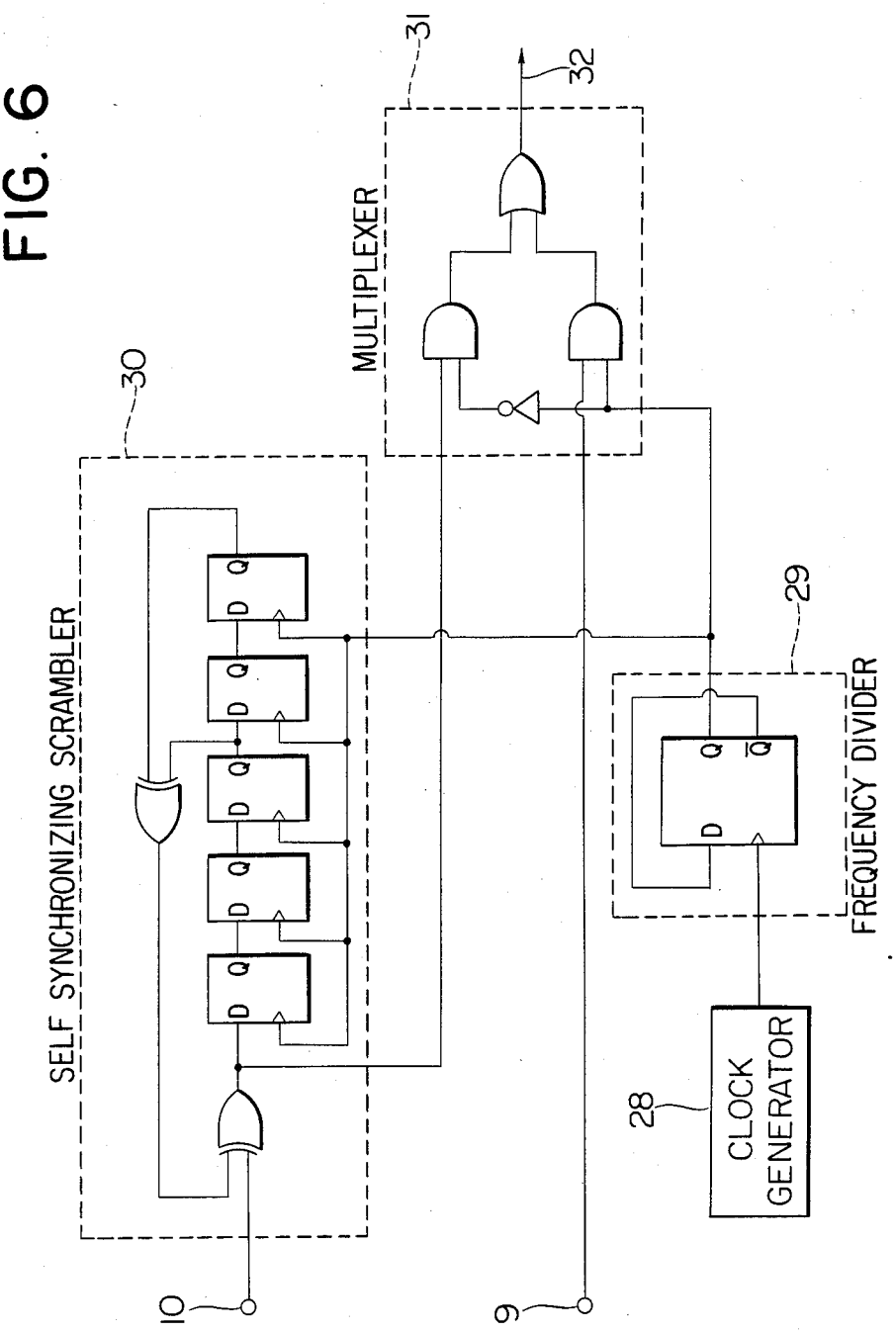
FIG. 6 is a block diagram of a multiplex circuit according to another embodiment of the present invention.

FIG. 6 is a block diagram of a multiplex circuit for performing data conversion by using an M-series scrambler according to a second embodiment of the present invention. The data converter 18 of the first embodiment may comprise a reset type scrambler in which the frame synchronizing signal F in the signal A in FIG. 3 is not scrambled and that in the signal B in FIG. 3 is scrambled. However, according to the second embodiment, one of the input signals is converted by a 5-stage self-synchronizing scrambler 30. A clock of 2f Hz from a clock generator 28 is frequency-divided by a frequency divider 29 which generates a clock of f Hz. The input signal 10 of the signals 9 and 10 is converted by the self-synchronizing scrambler 30. An output from the scrambler 30 does not include an alternating pattern of logic "1" and "0" for every 9 bits. Therefore, when a multiplexer 31 performs bit multiplexing, an output 32 therefrom includes the frame synchronizing signals of the input signal 9 without modification and has an alternating pattern of logic "1" and logic "0" for every 18 bits. When the data converter 18 of the first embodiment comprises a reset type scrambler, the reset type scrambler can also serve as a scrambler generally used in data transmission lines.

Signal conversion can be performed such that the two channel signals are multiplexed, and that frame synchronzing signals of one channel are kept unscrambled and the multiplexed signal is scrambled. Alternatively, after the frame synchronizing signals of one channel are scrambled, the channel signals may be multiplexed. In addition to these modifications, the respective channel signals may be scrambled and multiplexed. In this case, the frame synchronizing signals of one channel must not be scrambled.

When the channel signals have different frame synchronizing signal formats, the multiplexed signals can be demultiplexed by using the frame synchronizing signals. In this case, scrambling and descrambling need not be performed.

What is claimed is:
1. A method of multiplexing digital signals, comprising the steps of:
  multiplexing serial digital signals of a plurality of channels which have a given transmission rate and each of which has frame synchronizing signals to a single serial signal,
  converting signals excluding the frame synchronizing signals of one selected channel to a format which allows inverse-conversion and which does not allow detection of the frame synchronizing signals, and
  using the frame synchronizing signals of said one selected channel as frame synchronizing signals of the single serial signal.

2. An apparatus for multiplexing digital signals, comprising: time-division bit multiplexing means for bit multiplexing n-channel serial digital signals to a single serial signal, the n-channel serial digital signals having a given transmission rate and each having frame synchronizing signals; frame synchronizing means for detecting timings of the frame synchronizing signals of one selected channel of the n channels; data converting means for data-converting serial digital signals in units of channels; and means for supplying the timings of the frame synchronizing signals detected by said synchronizing means to said data converting means, wherein said data converting means does not convert the frame synchronizing signals of said one selected channel and all remaining signals of the n-channel serial digital signals are scrambled.

3. Apparatus for multiplexing digital signals, comprising:

means for multiplexing serial digital signals of a plurality of channels which have a given transmission rate and each of which has frame synchronizing signals to a single serial signal;

means for converting signals excluding the frame synchronizing signals of one selected channel to a format which allows inverse-conversion and which does not allow detection of the frame synchronizing signals; and means for using the frame synchronizing signals of said one selected channel as frame synchronizing signals of the single serial signal.

* * * * *